United States Patent [19]

Van Dorn et al.

[11] Patent Number: 5,106,333
[45] Date of Patent: Apr. 21, 1992

[54] POULTRY PICKER

[75] Inventors: Andrew Van Dorn, Parksley, Va.; Ralph Riggleman, Seaford, Del.

[73] Assignee: Foodcraft Equipment Company, Lancaster, Pa.

[21] Appl. No.: 643,989

[22] Filed: Jan. 22, 1991

[51] Int. Cl.[5] .............................. A23C 7/00
[52] U.S. Cl. ........................ 452/91; 452/87
[58] Field of Search ............ 452/91, 82, 87, 86, 452/88, 89, , 90

[56] References Cited

U.S. PATENT DOCUMENTS

| | | |
|---|---|---|
| 2,484,236 | 10/1949 | Mead . |
| 3,235,904 | 2/1966 | Brown et al. . |
| 3,273,198 | 9/1966 | Tomlinson .................. 452/91 |
| 3,277,515 | 10/1966 | Engkjer et al. . |
| 3,402,424 | 9/1968 | Brown et al. . |
| 3,471,893 | 10/1969 | Zebarth et al. . |
| 3,477,093 | 11/1969 | Zebarth et al. . |
| 3,585,675 | 6/1971 | Crane ......................... 452/91 |
| 3,596,309 | 8/1971 | Vertegaal . |
| 4,064,596 | 12/1977 | Crane . |
| 4,217,678 | 8/1980 | Crawford et al. ............ 452/91 |
| 4,514,879 | 5/1985 | Hazenbroek ................ 452/91 |
| 4,884,318 | 12/1989 | Hazenbroek . |

FOREIGN PATENT DOCUMENTS

| | | | |
|---|---|---|---|
| 0411825 | 1/1974 | U.S.S.R. .................... 452/91 |
| 0759077 | 4/1978 | U.S.S.R. .................... 452/91 |

Primary Examiner—Bruce M. Kisliuk
Assistant Examiner—Lawrence Cruz
Attorney, Agent, or Firm—Shoemaker and Mattare

[57] ABSTRACT

A poultry picker comprises four independently movable banks of rotary picker heads. Each bank is supported at its ends by brackets, which are independently, vertically movable on respective uprights. Each bank can be moved toward or away from its upright by one adjustment mechanism, and another mechanism is provided for tilting the bank about its longitudinal axis. In addition, the uprights are pivotally mounted on a common base, and can be tilted outward from their normal vertical position, to provide access to the picker heads for cleaning.

5 Claims, 3 Drawing Sheets

POULTRY PICKER

BACKGROUND OF THE INVENTION

This invention relates generally to the field of food processing, and more particularly to a method and apparatus for removing feathers from slaughtered poultry.

It is conventional to remove feathers by passing birds against an array of moving rubber fingers. Frictional forces between the fingers and the feathers are sufficient to remove all but the smallest feathers from the bird. The remaining few feathers may be removed by hand and/or singing.

One type of plucking apparatus has plural banks of heads rotating on parallel axes; these axes are aligned in one or more planes, and the path along which the birds are moved is parallel to such planes. The fingers extend from their heads generally parallel to the axes of the heads, toward the path of the birds.

The banks of picker heads in such devices are normally stationary, but prior inventors have proposed various arrangements whereby the position and/or orientation of the banks may be adjusted, to optimize performance, or to adapt the unit to different species or sizes of birds. The following U.S. patents are cited as examples of this technology: U.S. Pat. Nos. 2,484,236, 3,235,904, 3,277,515, 3,402,424, 3,471,893, 3,477,093, 3,585,675, 3,596,309, 4,064,596, 4,217,678, 3,514,879 and 3,884,318.

SUMMARY OF THE INVENTION

The present invention is an improvement over the above art, in that it enables one to adjust four banks of pickers both toward and away from one another, and in addition permits universal pivoting adjustment of each bank.

An object of the invention is to improve feather removal in automated bird processing facilities.

Another object is to render a feather plucking apparatus useful for plucking birds of widely varying sizes.

A further object is to give a plucking machine operator complete control over the spacing and orientation of individual banks of plucking heads, so that he can optimize performance of the machine as process parameters change.

These and other objects of the invention are met by poultry picker comprising a base with two pivotable structural frames extending upward from the base, the frames supporting two pairs of opposed picker banks, each including a plurality of rotary picker heads. Each picker bank is independently vertically adjustable with respect to its frame, and can be moved toward and away from each other. Also, means are provided for tilting each bank independently about its longitudinal axis, to vary the inclination of its picker heads.

BRIEF DESCRIPTION OF THE DRAWINGS

In the accompanying drawings.

DESCRIPTION OF THE PREFERRED EMBODIMENT

Figure 1:
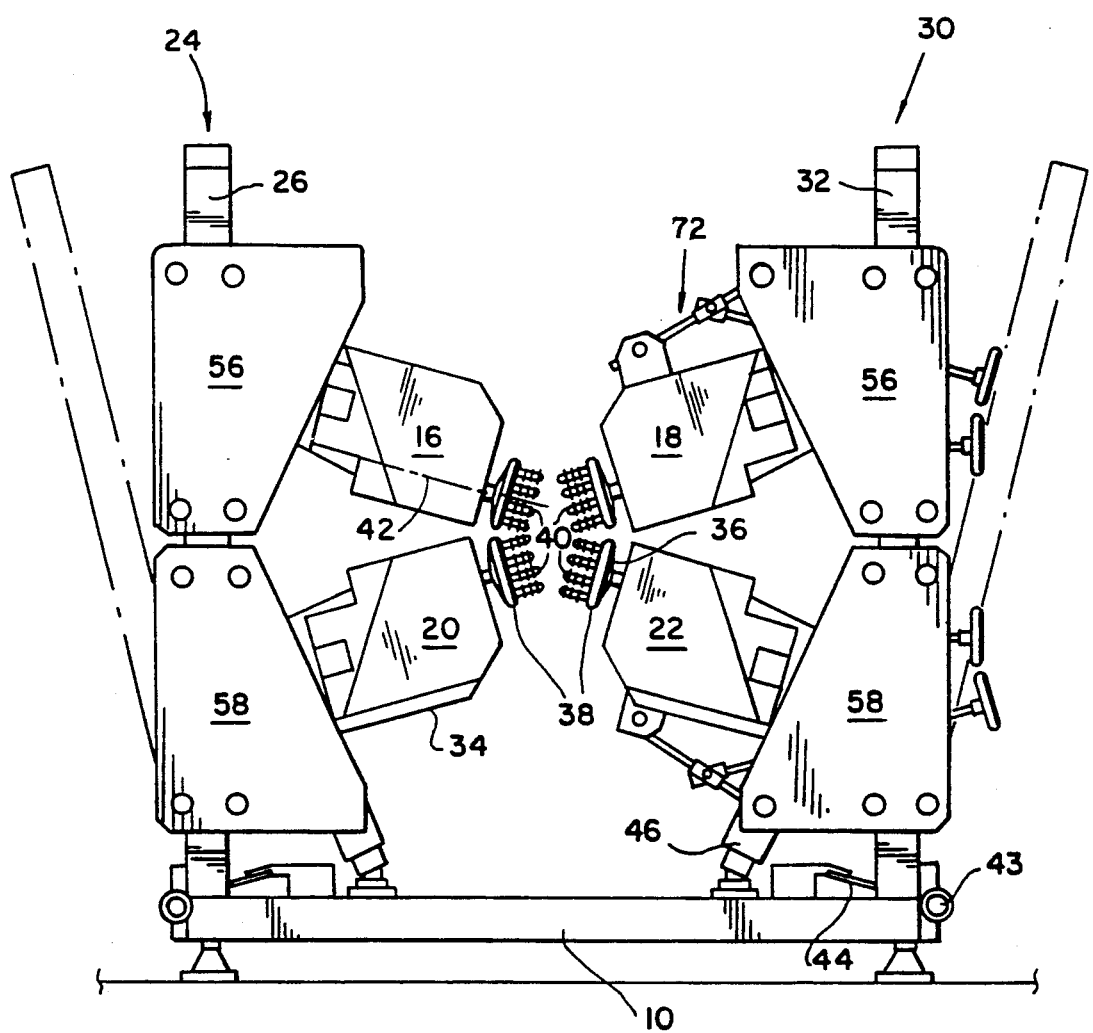
FIG. 1 is an end view of a plucking apparatus embodying the invention, looking through the apparatus in a direction parallel to the product flow path.
Figure 2:
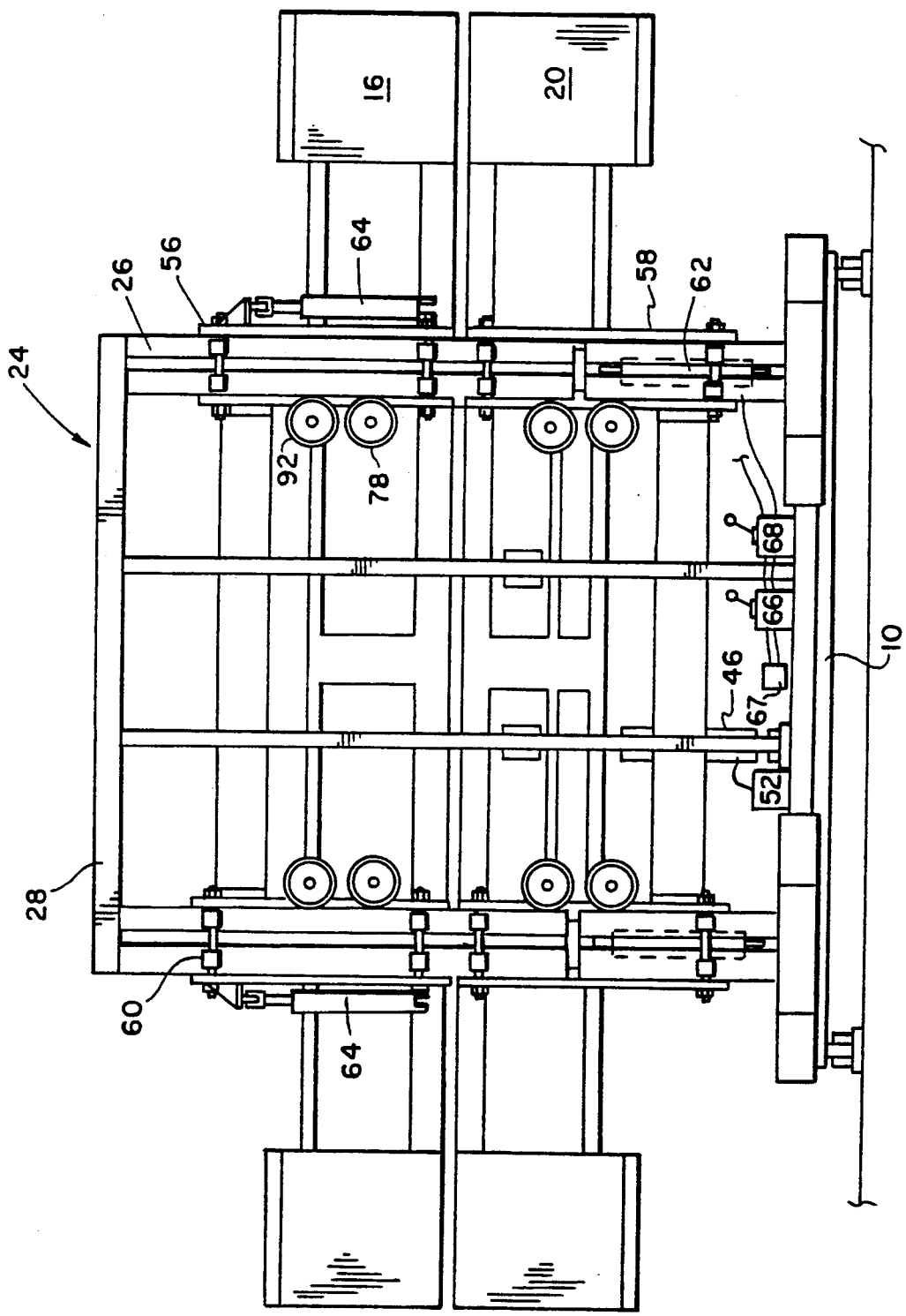
FIG. 2 is a side elevation thereof.
Figure 3:
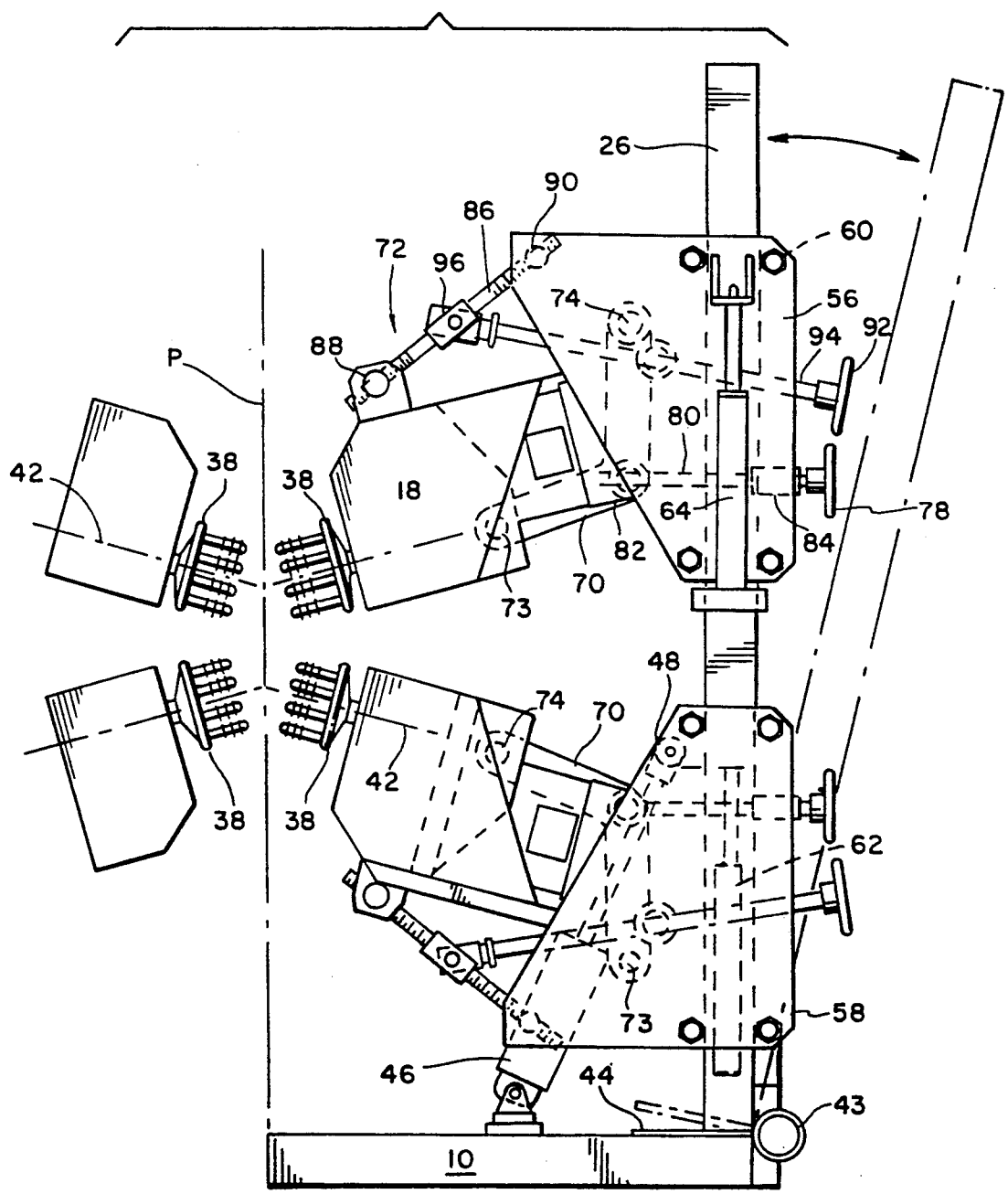
FIG. 3 is a view corresponding to FIG. 1, with parts removed to show the essential features of the invention.

As shown in the drawings, an apparatus embodying the invention comprises a stationary base 10. The base supports four picker banks 16,18,20,22 of generally similar construction. The two left side picker banks 16,20 are supported on a structural frame 24 formed of two uprights 26 interconnected by a crossbar 28; a similar frame 30 having uprights 32 supports the right side picker banks.

Each picker bank assembly itself is of generally conventional design, and thus the internals of the picker banks are not shown in the drawings. It should suffice for an understanding of this invention to state that each bank comprises a metal housing 34 supporting a substantial number of picker heads 36, each having a disc 38 outside the housing, with a number of conventional rubber fingers 40 extending from its face. The discs rotate on separate, parallel axes 42 that are aligned in a common plane. This plane is nearly horizontal, but its inclination to the horizontal can be adjusted, as described further below. Within each housing, the heads are rotated in alternating directions by a motordriven chain or belt (not shown) that passes sinuously over and under successive pulleys or sprockets (not shown) attached to the picker shafts.

Since the left and right halves of the apparatus are substantially mirror images of one another, on either side of a vertical center plane P, we describe only the left half in detail below.

The upright 26 supporting the front end of the left picker banks is representative of the four uprights in this apparatus. Each upright is attached to the base 10 by a hinge connection 43, so that its frame can pivot outward, away from the center plane, to increase the spacing therebetween to provide access to the picker heads for cleaning. The plate 44 acts against the base as a stop to prevent the uprights from moving inward past vertical.

About 13° of pivoting movement of each upright is produced by an obliquely oriented hydraulic cylinder 46, pinned at its lower end to the base 10, and at its upper end to a tab 48 extending laterally from the upright 24. We presently prefer to connect all four of these cylinders to a source of fluid pressure through a common valve 52, so that the cylinders act in unison; however, it may be desirable in some situations to permit independent cylinder operation.

Each of the four uprights mounted on it spaced upper and lower brackets 56, 58, each of which can move up and down the upright within limits. Each bracket and has four guide wheels 60, straddling the upright, to facilitate such motion. The brackets can be elevated or lowered by respective, independent hydraulic cylinders 62, 64 mounted within the upright (for the lower bracket) or just outside (for the upper bracket). The drawings illustrate a first control valve 66 which is connected between a pump 67 and all four of the upper hydraulic cylinders 64, and a second control valve 68 connected to the four lower cylinders 62. With such parallel connections, both ends the lower housings are raised and lowered in unison, independent of movement of the upper housings. While the common, parallel connection arrangement is presently preferred, we expect it will be preferable in some situations to provide for independent movement.

The upper and lower picker bank housings are suspended away from each of the brackets by pair of links at each end of the picker housing. Each link pair comprises a main, boomerang-shaped support arm 70 having pivot connections 73, 74 at either end, and an adjustable link 72 described in the following paragraph. The lower end of the support arm is connected to the rear of the picker housing, and the upper end is connected to the bracket at point 74. The support arm permits the picker bank to be moved toward or away from the center plane of the apparatus. To produce such motion, a linear motor is provided, preferably in the form of a handwheel 78 on a threaded shaft 80 that passes through a brass clevis 82 at the crotch of the link. The end of the shaft near the handwheel extends through a bearing 84 which has a pin mounting to the bracket.

The upper, adjustable, link 72 is a rod 86 having threads of opposite hand at either end. These threads extend through correspondingly threaded clevises 88, 90, one at the upper side of the housing, and one in the upper corner of the bracket. Turning the rod varies the distance between the clevises, thus tilting the housing up or down, around the fixed pivot 73. The rod is turned by means of a handwheel 92 on a driveshaft 94 extending along an axis oblique to the rod, driving through an angled gearbox 96. Alternatively, a handwheel could be provided directly on the threaded shaft.

Similar structure is provided at the downstream end of the apparatus, for supporting the far end of the housing.

The lower picker bank housing is similarly supported at either end by like linkage from corresponding brackets on the same uprights. These brackets may have different proportions, but are structurally similar—and functional identically—to those described above. A corresponding set of adjusters is provided at each end of the apparatus.

The right-side banks are supported by mirror-image duplicates of the structure described above. In all, therefore, there are four uprights, and eight independent brackets supporting the ends of the four independent picker bank housings; this permits the banks to be moved laterally, and tilted, independent from each other. Additionally, it is contemplated that it may sometimes be desirable to set the picker banks along axes not parallel to each other, or to the product flow path. For example, the spacing between left and right banks could be narrowed as the birds pass along their path through the machine. The independent vertical adjustability also makes it possible to incline the picker banks lengthwise, so that they can pick different spots on the bird as it progresses.

In operation, a series of just-slaughtered birds are carried by a shackle conveyor, not shown, along a linear path extending between the four pairs of picker banks. As the birds pass through the machine, the feathers are pulled out by the moving rubber fingers on the picker heads. By appropriately operating the adjusters at either end of the machine, the spacing and orientation of the pickers may be set up before processing of a given type of bird begins, and then fine tuned during operation to optimize feather removal.

An advantage of the invention is that each end of each picker bank housing has two separate possible motions with respect to the mounting brackets, the brackets have a third motion with respect to uprights. This provides each bank with at least three degrees of freedom (five, if the ends are adjusted unequally—the only housing movement not possible is parallel to the product path).

Variations on the particular structure described above will occur to those of skill in this field of art. Manual adjustments could be motorized, for example, and viceversa. For this reason, the term "linear motor" is used in the claims that follow, as generic to hydraulic cylinders, rotary threaded shaft actuators, whether operated manually or by motors, and all other means for producing relative linear motion between two points.

Also, the picker heads described could be replaced by heads of a different type, and numerous other changes could be made, depending on the intended application.

Inasmuch as the invention is subject to these and other modifications and variations, it is intended that the foregoing description and the accompanying drawings shall be interpreted as illustrative of only one form of the invention, whose scope is to be measured by the following claims.

I claim:

1. A poultry picker comprising
a base,
two structural frames, each comprising a pair of uprights extending upward from said base,
at least two pairs of opposed picker banks, each including a plurality of rotary picker heads, each bank being connected at each end to a respective one of said uprights, and each of said banks having a substantially horizontal longitudinal axis,
all of said banks being independently vertically movable with respect to said uprights and with respect to each other,
means for moving said banks vertically, independent of one another,
means for moving each of said banks independently toward and away from its frame, and
means for tilting each bank independently about its longitudinal axis, to vary the inclination of its picker heads,
said means for moving the banks vertically comprising means for elevating the ends of each bank independently, so as to enable tilting of the longitudinal axis of the bank with respect to horizontal.

2. A poultry picker comprising
a base,
two structural frames, each comprising a pair of uprights extending upward from said base,
at least two pairs of opposed picker banks, each including a plurality of rotary picker heads, each bank being connected at each end to a respective one of said uprights, and each of said banks having a substantially horizontal longitudinal axis,
all of said banks being independently vertically movable with respect to said uprights and with respect to each other,
means for moving said banks vertically, independent of one another,
means for moving each of said banks independently toward and away from its frame,
means for tilting each bank independently about its longitudinal axis, to vary the inclination of its picker heads, and further comprising
a hinge connection between each of said uprights and said base, each said hinge connection having a pivot axis parallel to the longitudinal axis of the picker banks, whereby the banks of pickers can be spread apart substantially by tilting them outward, away from one another, to provide access to the picker heads for cleaning.

3. A poultry picker comprising a base, two structural frames, each comprising a pair of uprights extending upward from said base, two pairs of opposed picker banks, each including a plurality of rotary picker heads, each bank being connected at each end to a respective one of said uprights, and each of said banks having a substantially horizontal longitudinal axis, said banks being independently vertically movable with respect to said uprights, means for moving said banks vertically, means for moving each of said banks independently toward and away from its frame, means for tilting each bank independently about its longitudinal axis, to vary the inclination of its picker heads, and a pair of brackets for supporting the picker banks, each bracket being connected to one end of its respective bank by a main link connected at one end to the bracket, and at its other end to the bank, and wherein each of the means for moving the picker banks independently toward and away from each other comprises a linear motor disposed between the upright and the link.

4. A poultry picker comprising a base, two structural frames, each comprising a pair of uprights extending upward from said base, two pairs of opposed picker banks, each including a plurality of rotary picker heads, each bank being connected at each end to a respective one of said uprights, and each of said banks having a substantially horizontal longitudinal axis, said banks being independently vertically movable with respect to said uprights, means for moving said banks vertically, means for moving each of said banks independently toward and away from its frame, means for tilting each bank independently about its longitudinal axis, to vary the inclination of its picker heads, wherein the means for tilting each picker bank comprises a rod threaded in opposite directions at its ends, each of said ends engaging a correspondingly threaded clevis, one in said bracket, and one in said picker bank, and further comprising means for rotating said rod.

5. The invention of claim 4, wherein said rotating means comprises a driveshaft extending along an axis oblique to that of said rod, and an angled gear drive interconnecting said rod and said driveshaft, and further comprising means for rotating the driveshaft.

* * * * *